(12) United States Patent
Tobin

(10) Patent No.: US 10,108,318 B2
(45) Date of Patent: *Oct. 23, 2018

(54) REFLOW OF DATA PRESENTATION USING TRACKING DATA

(71) Applicant: eBay Inc., San Jose, CA (US)

(72) Inventor: John Patrick Edgar Tobin, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,297

(22) Filed: May 23, 2016

(65) Prior Publication Data

US 2016/0266753 A1    Sep. 15, 2016

Related U.S. Application Data

(63) Continuation of application No. 14/050,080, filed on Oct. 9, 2013, now Pat. No. 9,349,142.

(51) Int. Cl.
| | |
|---|---|
| *G06F 3/0484* | (2013.01) |
| *G06F 3/0481* | (2013.01) |
| *G06Q 30/06* | (2012.01) |
| *H04L 29/08* | (2006.01) |
| *H04L 29/06* | (2006.01) |

(52) U.S. Cl.
CPC ....... *G06F 3/0484* (2013.01); *G06Q 30/0641* (2013.01); *H04L 67/02* (2013.01); *H04L 67/306* (2013.01); *H04L 67/42* (2013.01)

(58) Field of Classification Search
CPC .......... G06F 3/00; G06F 3/048; G06F 3/0841; G06F 3/0482; G06F 3/0484; G06F 9/4443; G06F 15/16; G06F 15/173; G06F 17/60; H04L 29/06; H04L 29/0809; G06Q 30/02; G06Q 30/0222; G06Q 30/0251;
(Continued)

(56) References Cited

U.S. PATENT DOCUMENTS 7,356,590 B2    4/2008  Wilson et al.
8,898,184 B1 *  11/2014 Garman ............ G06F 17/30864
                                                        705/26.1
(Continued)

FOREIGN PATENT DOCUMENTS

| AU | 2014331884 A1 | 5/2016 |
|---|---|---|
| CN | 105765618 A | 7/2016 |

(Continued)

OTHER PUBLICATIONS

"U.S. Appl. No. 14/050,080, Non Final Office Action mailed Sep. 30, 2015", 11 pgs.
(Continued)

*Primary Examiner* — Xiomar L Bautista
(74) *Attorney, Agent, or Firm* — Wolfe-SBMC

(57) ABSTRACT

In an example embodiment, a script defining a flow of a user interface is distributed to a user application operating on a client device. Then interactions between users on one or more client devices and one or more server devices are tracked. The script is then modified based on the information about the interactions, the modification changing the flow. The modified script may then be distributed to the user application, thus causing a modification in the flow of the user interface of the user application.

16 Claims, 11 Drawing Sheets

(58) Field of Classification Search
CPC .......... G06Q 30/0601; G06Q 30/0641; G06Q 20/20; G06Q 20/203; G06Q 99/00; G06N 5/02

See application file for complete search history.

(56) References Cited

U.S. PATENT DOCUMENTS

| | | | |
|---|---|---|---|
| 9,349,142 | B2 | 5/2016 | Tobin |
| 2005/0097008 | A1 | 5/2005 | Ehring et al. |
| 2005/0171853 | A1* | 8/2005 | Fettig ..................... G06Q 20/20 705/22 |
| 2005/0188303 | A1 | 8/2005 | Ayers et al. |
| 2007/0073553 | A1* | 3/2007 | Flinn ..................... G06N 99/005 705/1.1 |
| 2008/0201206 | A1 | 8/2008 | Pokorney et al. |
| 2009/0037354 | A1* | 2/2009 | Fernandes ............. H04L 67/306 706/45 |
| 2009/0199114 | A1* | 8/2009 | Lewis ..................... G06Q 30/02 715/763 |
| 2009/0254836 | A1 | 10/2009 | Bajrach |
| 2012/0310717 | A1* | 12/2012 | Kankainen ............. G06Q 30/02 705/14.4 |
| 2013/0073473 | A1* | 3/2013 | Heath ..................... G06Q 30/02 705/319 |
| 2013/0263023 | A1 | 10/2013 | Goodwin et al. |
| 2015/0100891 | A1 | 4/2015 | Tobin |
| 2015/0154643 | A1* | 6/2015 | Artman ............... G06F 17/3087 705/14.66 |
| 2017/0161085 | A1 | 6/2017 | Tobin |

FOREIGN PATENT DOCUMENTS

| | | | |
|---|---|---|---|
| KR | 1020110030461 | A | 3/2011 |
| KR | 1020110035851 | A | 4/2011 |
| KR | 1020110053987 | A | 5/2011 |
| WO | WO-2015054486 | A1 | 4/2015 |

OTHER PUBLICATIONS

"U.S. Appl. No. 14/050,080, Notice of Allowance mailed Jan. 26, 2016", 5 pgs.

"U.S. Appl. No. 14/050,080, Response filed Dec. 29, 2015 to Non Final Office Action mailed Sep. 30, 2015", 8 pgs.

"Australian Application Serial No. 2014331884, First Examiner Report mailed May 5, 2016", 2 pgs.

"International Application Serial No. PCT/US2014/059887, International Preliminary Report on Patentability mailed Apr. 21, 2016", 8 pgs.

"International Application Serial No. PCT/US2014/059887, International Search Report mailed Jan. 7, 2015", 2 pgs.

"International Application Serial No. PCT/US2014/059887, Written Opinion mailed Jan. 7, 2015", 6 pgs.

"European Application Serial No. 14852193.3, Extended European Search Report dated Sep. 1, 2016", 7 pgs.

"U.S. Appl. No. 15/441,454, Preliminary Amendment filed Mar. 21, 2017", 7 pgs.

"Chinese Application Serial No, 201480064154.5, Office Action dated Dec. 30, 2016", with English translation of claims, 16 pgs.

"Chinese Application Serial No. 201480064154.5, Office Action Response dated May 15, 2017.", with English translation of claims, 12 pgs.

"European Application Serial No. 14852193.3, Response filed Mar. 17, 2017 to Office Action dated Sep. 20, 2016", 12 pgs.

"Korean Application Serial No. 10-2016-7011922, Final Office Action dated Feb. 28, 2017", with English translation of claims, 5 pgs.

"Korean Application Serial No. 10-2016-701192; Request for Re-Examination filed May 31, 2017", with English translation of claims, 17 pgs.

U.S. Appl. No. 15/441,454, filed Feb. 24, 2017, Reflow of data presentation using tracking data.

"Chinese Application Serial No. 201480064154.5, Office Action dated Jul. 19, 2017", with English translation of claims, 13 pgs.

"Korean Application Serial No. 10-2016-7011922, Office Action dated Jul. 10, 2017", with English translation of claims, 8 pgs.

Response to Office Action filed on Sep. 11, 2017, for Korean Patent Application No. 10-2016-7011922, dated Jul. 10, 2017, 13 pages (Including English Translation of Claims).

Response to Office Action filed on Oct. 9, 2017, for Chinese Patent Application No. 201480064154.5, dated Jul. 19, 2017, 10 pages (Including English Translation).

Office Action received for Korean Patent Application No. 10-2016-7011922, dated Nov. 23, 2017, 5 pages (Including English Translation).

Office Action received for Chinese Patent Application No. 201480064154.5, dated Dec. 7, 2017, 12 pages (Including English Translation).

Response to Office Action filed on Jan. 23, 2018, for Korean Patent Application No. 10-2016-7011922, dated Nov. 23, 2017, 31 pages (Including English Translation of Claims).

Response to Office Action filed on Feb. 22, 2018, for Chinese Patent Application No. 201480064154.5, dated Dec. 7, 2017, 14 pages.

Notice of Allowance received for Australian Application No. 2014331884, dated May 31, 2016, 2 pages.

Office Action received for Korean Patent Application No. 10-2016-7011922, dated Oct. 4, 2016, 12 pages (7 pages of English Translation and 5 pages of Official Copy).

Response to Office Action filed on Nov. 25, 2016, for Korean Patent Application No. 10-2016-7011922, dated Oct. 4, 2016, 25 pages (Including English Translation of Claims).

Communication Pursuant to Article 94(3) EPC received for European Patent Application No. 14852193.3, dated Mar. 2, 2018, 6 pages.

Office Action received for Chinese Patent Application No. 201480064154.5, dated May 3, 2018, 14 pages.

Office Action received for Korean Patent Application No. 10-2016-7011922, dated Apr. 23, 2018, 6 pages (Including English Translation).

Response to Office Action for Korean Application No. 2016-7011922, filed on Jun. 19, 2018, 21 pages.

Response to Office Action for European Application No. 14852193.3, filed on Jul. 2, 2018, 9 pages.

Request for Reexamination Filed on Aug. 17, 2018, for Chinese Patent Application No. 201480064154.5, 16 pages (10 pages of Official Copy and 6 pages of English Translation).

* cited by examiner

REFLOW OF DATA PRESENTATION USING TRACKING DATA

PRIORITY

This patent application is a continuation of U.S. patent application Ser. No. 14/050,080, titled "REFLOW OF DATA PRESENTATION USING TRACKING DATA," filed Oct. 9, 2013, which is hereby incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data presentation on electronic devices and, in one specific example, to techniques for reflow of data presentation using tracking data.

BACKGROUND

The use of mobile devices, such as cellphones, smartphones, tablets, and laptop computers, has increased rapidly in recent years. The majority of these mobile devices are controlled by users via touchscreens. As such, there has been an increased focus on user interfaces, which involve the presentation of data to users and interactions with the data.

BRIEF DESCRIPTION OF THE DRAWINGS

Some embodiments are illustrated by way of example and not limitation in the figures of the accompanying drawings in which.

DETAILED DESCRIPTION

Example methods and systems for reflow of data presentation using tracking data are provided. It will be evident, however, to one skilled in the art that the present inventive subject matter may be practiced without these specific details.

According to various exemplary embodiments, data presentation in a user interface is automatically modified based on tracking data. The user interface may utilize scripts to describe the flow of various interactions with the user. In an example embodiment, a user interface script is dynamically modified based on the tracking data, causing the flow of the interactions to be modified, hence the "reflow" of the data presentation is accomplished.

Figure 1:
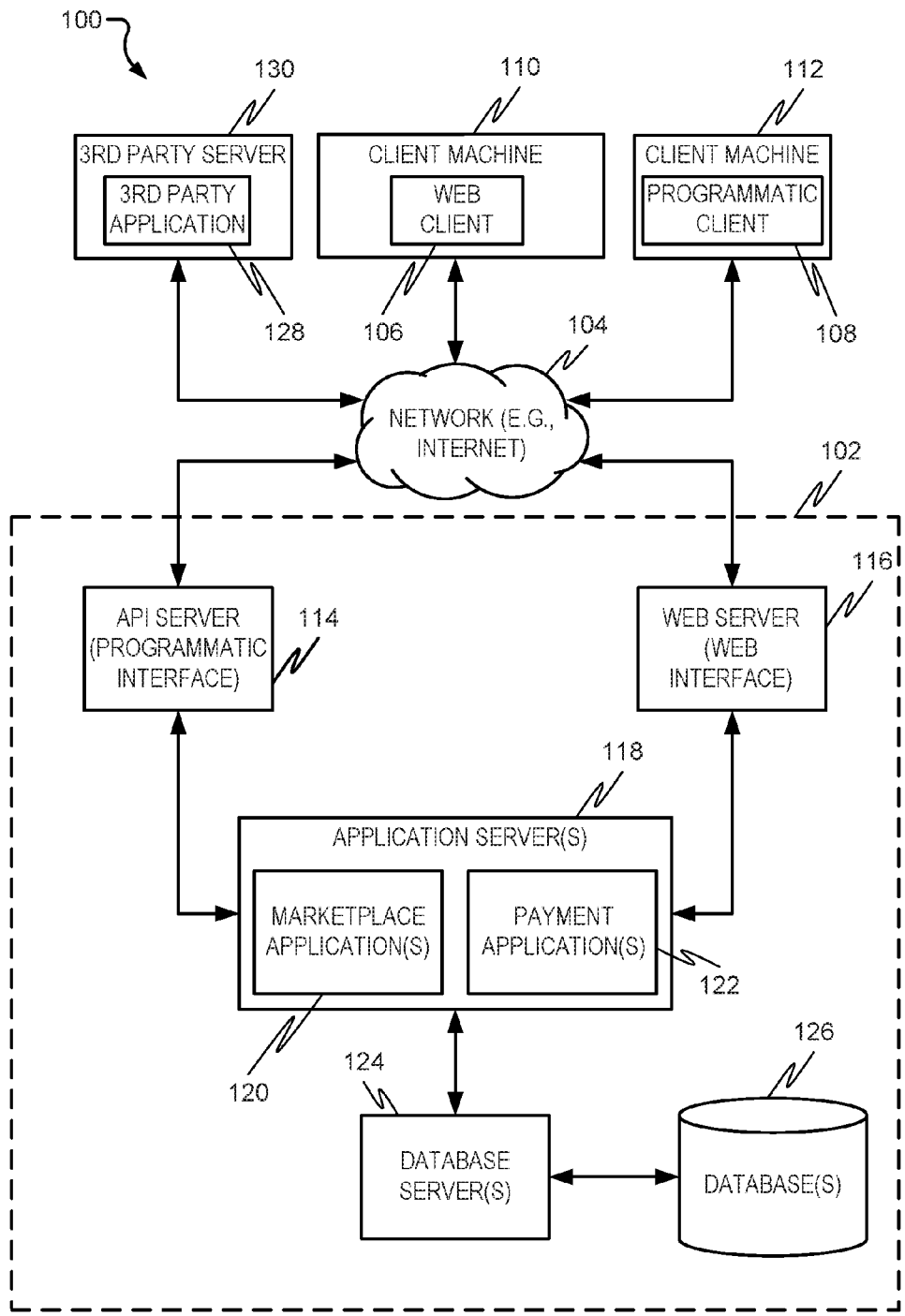
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash.) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
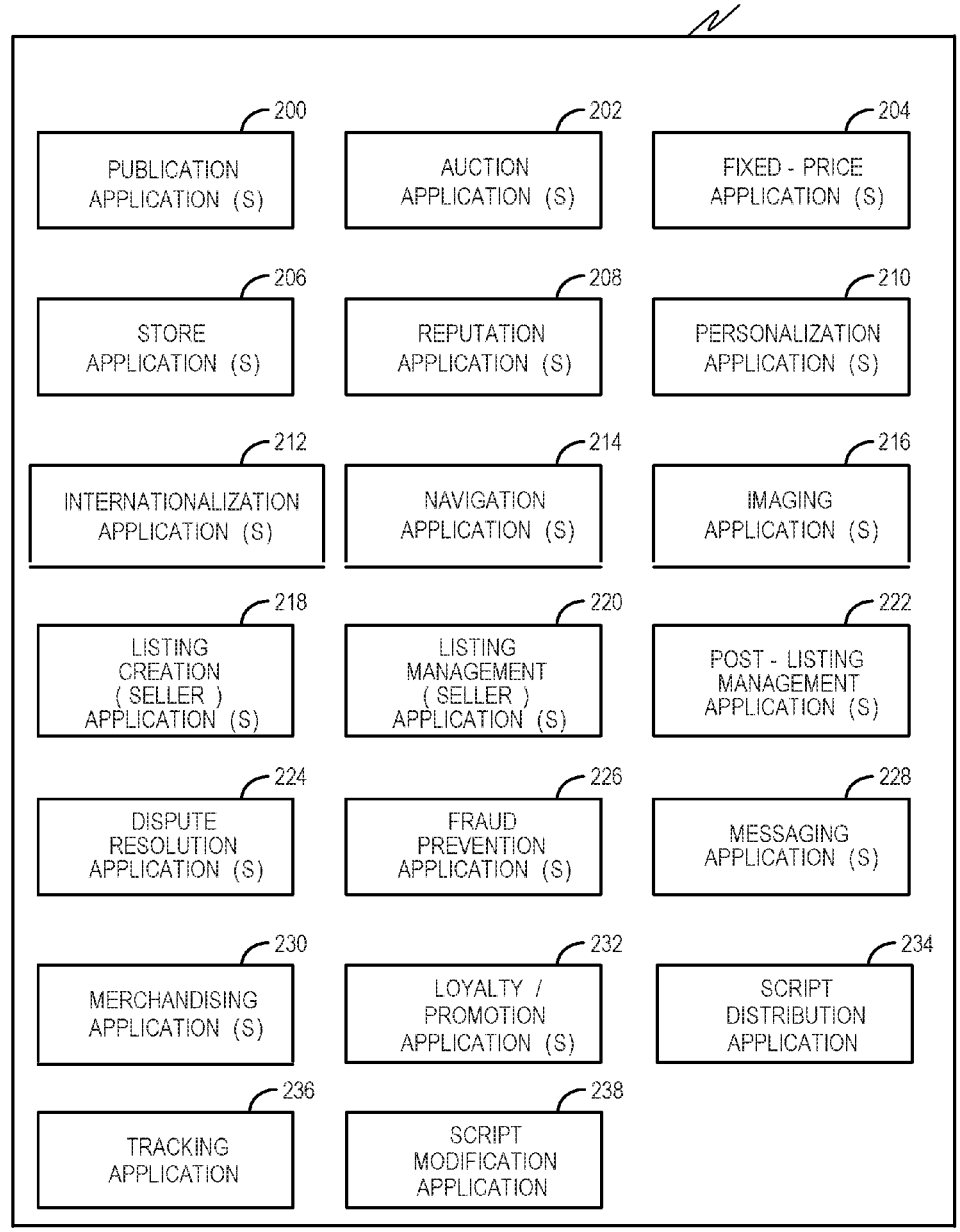
FIG. 2 is a block diagram illustrating marketplace and payment applications that, in one example embodiment, are provided as part of the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

A script distribution application 234 may distribute scripts to one or more client devices. The scripts may define flows executed in various user interfaces of applications running on the one or more client devices.

A tracking application 236 may monitor various interactions in the system, and specifically user interactions with user interfaces. This tracking application 236 may monitor, for example, how a user interacts with a user interface and may store this information, but may also include other types of information as well. Generally this information may be known as "analytics." The tracking application 236 may store many different types of analytics information, some of which may be relevant to a determination as to how to modify flow by modifying a script of an application running on a user device. Examples of such information may include, but are not limited to, demographic information, user profile information, contextual information (e.g., information about what the user did before or after engaging in a flow), previous flow usage information, purchase information, location information, experience level of the user, a type of the user, etc.). Generally speaking, any piece of information that could potentially be used to refine the flow may be relevant information.

A scripting modification application 238 may then modify scripts of user interfaces based on this stored information. More particularly, the scripting modification application 238, which operates on a server, may modify the script of a user interface that executes on a client device that is associated with a user, based on the user's previous interactions, whether with the specific user interface executing on the client device, or other user interfaces, such as one executing on a different client device. The script distribution application 234 may then distribute the revised script(s) to the appropriate client devices. This allows the system to customize the user interface for the user in a way that makes the user's interactions ore efficient.

Figure 3:
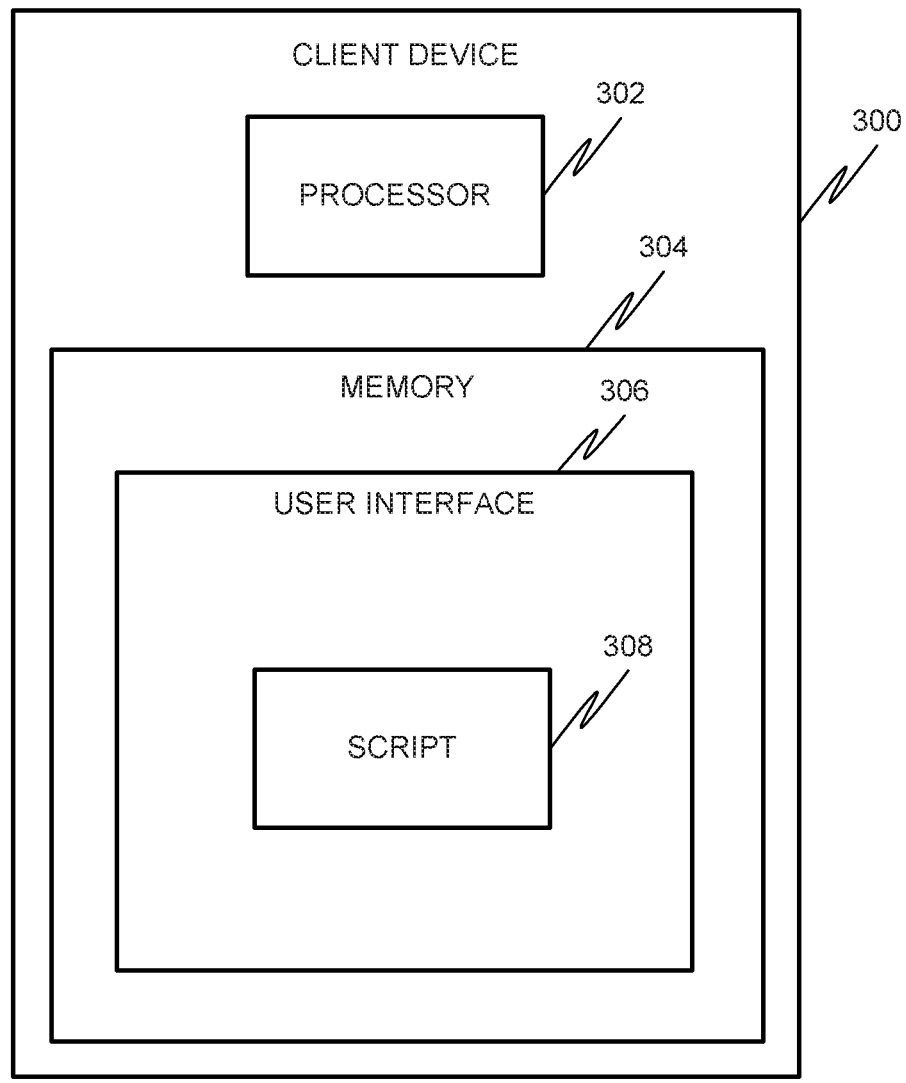
FIG. 3 is a block diagram illustrating a client device, in accordance with an example embodiment.

FIG. 3 is a block diagram illustrating a client device 300, in accordance with an example embodiment. The client device 300, may be, for example, device 110 or 112 of FIG. 1. The client device 300 may include a processor 302 and memory 304. The memory 304 may store a user interface 306 having a script 308. The script 308 may be written in a scripting language and can be interpreted by a special runtime environment for the user interface 306. One example scripting language is JavaScript, although this disclosure is not limited to JavaScript embodiments. In some example embodiments, the user interface 306 may be a web browser. Alternatively, the user interface 306 may be a stand-alone application.

In an example embodiment, based at least in part on tracking information, a server acts to modify the script 308 stored on the client device 300. This acts to alter the manner in which the user interface 306 interacts with the user.

Examples will now be provided in the e-commerce area, although one of ordinary skill in the art will recognize that the disclosure is not limited to e-commerce or e-commerce type flows.

Figure 4:
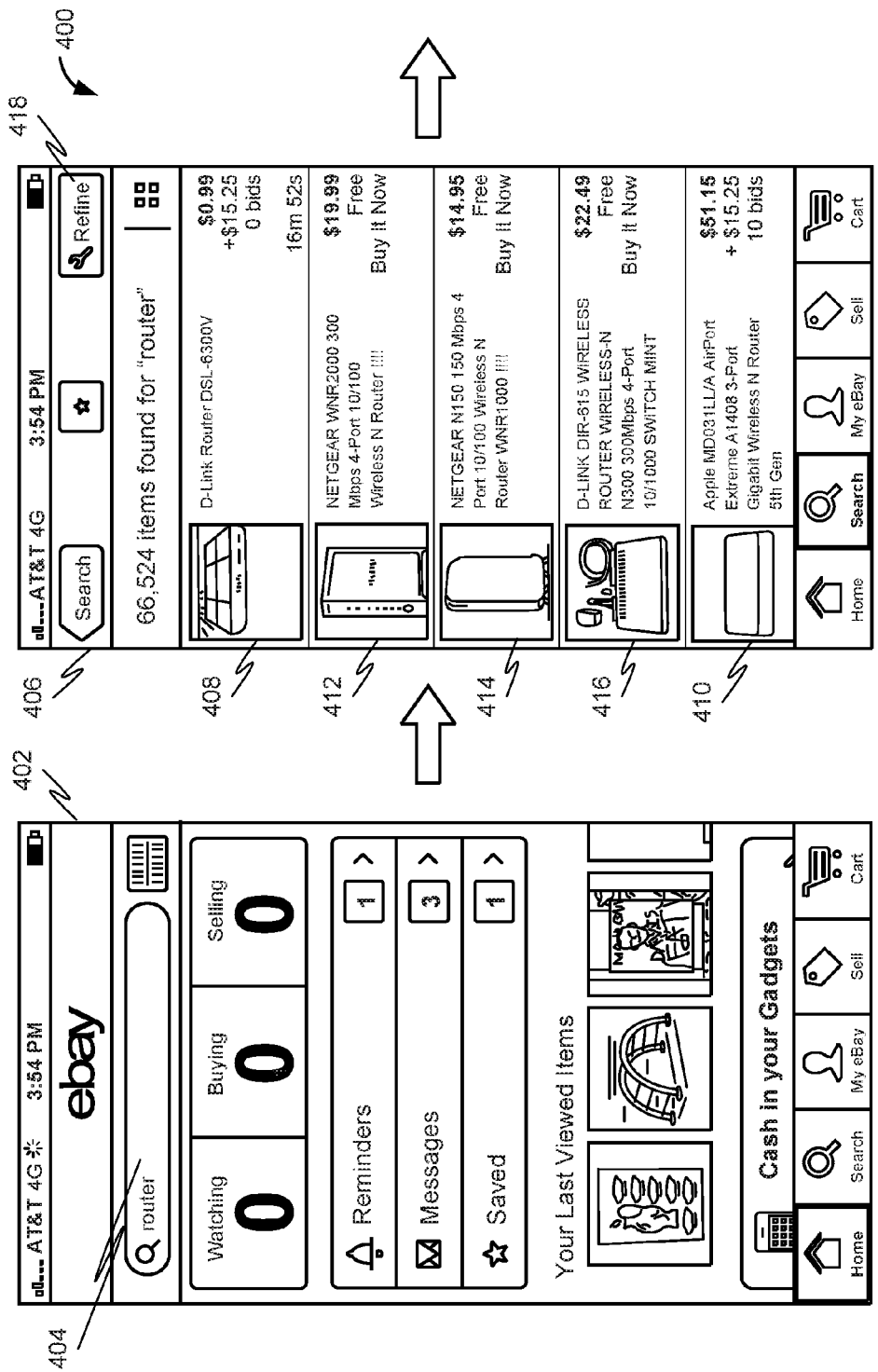
FIG. 4 is a diagram illustrating screen captures of a flow of an e-commerce application in accordance with an example embodiment.
Figure 4:
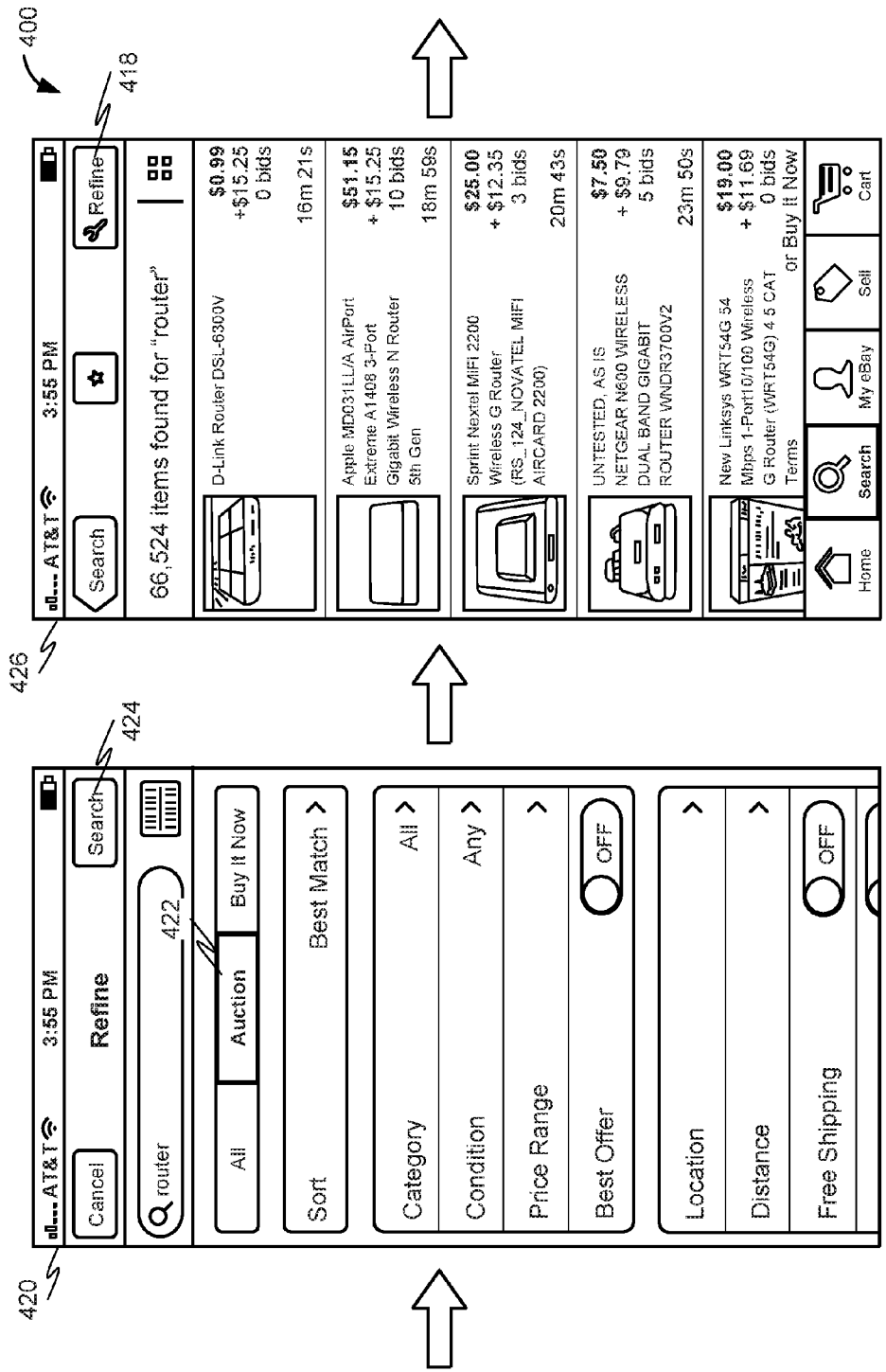
Figure 4:
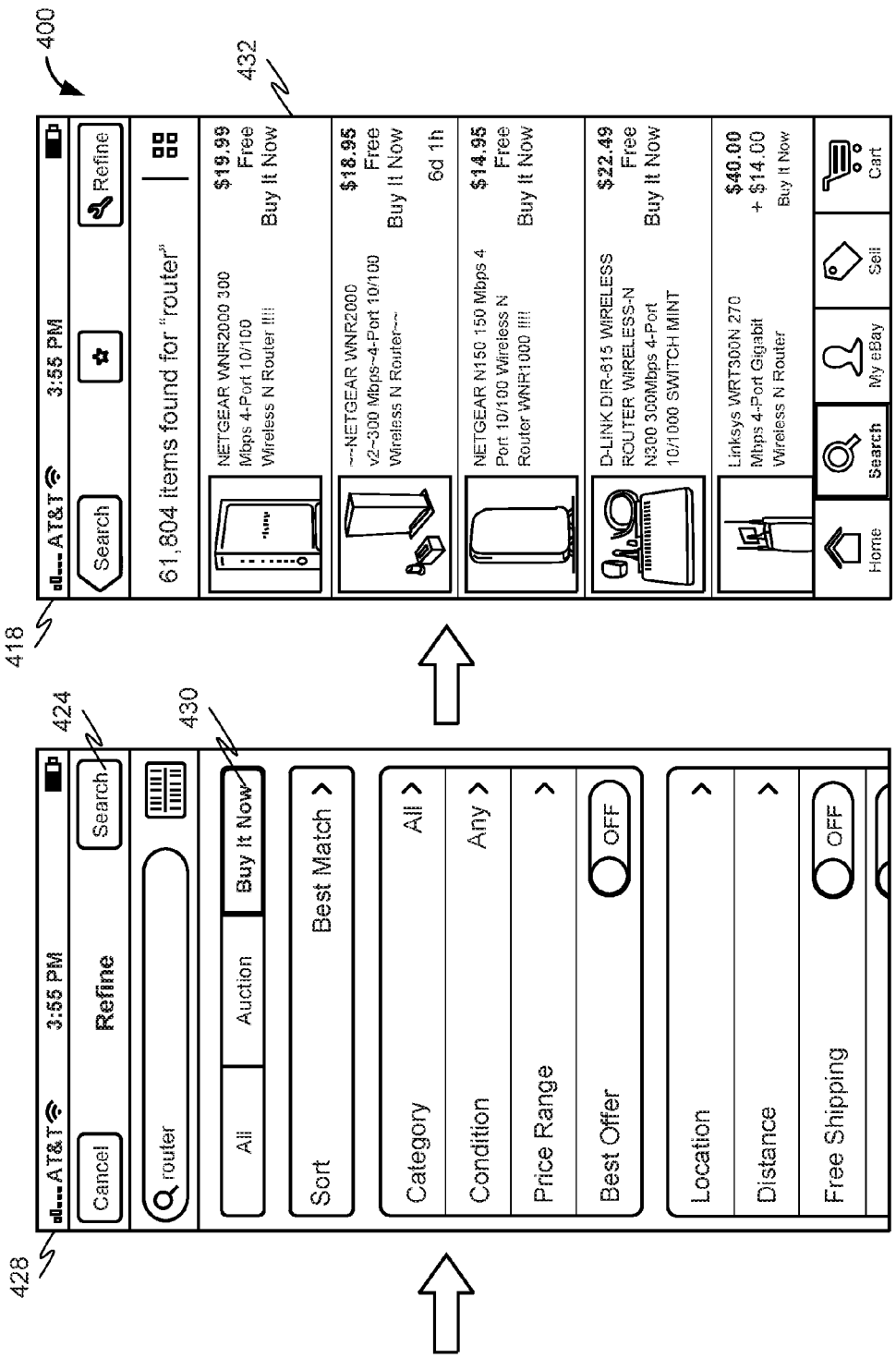

FIG. 4 is a diagram illustrating screen captures of a flow 400 of an e-commerce application in accordance with an example embodiment. The flow 400 begins with screen 402, which includes a text input box 404 where a user can enter a search query. Here the user has entered the term "router" in the text input box 404. Upon the user hitting return on their keyboard, or some other mechanism to indicate the desire to search the entered term, an e-commerce server is queried and a number of item results that match the entered term are returned. This is depicted at screen 406. Notably, screen 406 depicts both items that are auctions, such as 408 and 410, and items that are fixed price, also known as "buy-it-now", such as 412, 414, and 416. The user may then decide that he or she wishes to only see auction items, and thus may press a refine button 418 or perform some other action indicating a desire to alter which search results are displayed. The result is screen 420, which allows a user to select only auction results by selecting button 422. Upon hitting the search button 424, the search results are refined to only show auction results, resulting in screen 426.

The user may then decide that he or she wishes to only see auction items, and thus may press the refine button 418 again, resulting in screen 428, which allows the user to select only buy it now results by selecting button 430. The resulting screen 432 displays only buy it now results.

In an example embodiment, the system investigates whether there may be some indication of preferring a different flow for the same process. As an example, assume that the user has performed the flow depicted in FIG. 4 multiple times, never selected an item from the search results of screen 406, but instead only selected items from the search results of screens 426 and 432. The system may then deduce that the user has no real interest in viewing search results as a whole and would rather see them organized in either auction-only or buy-it-now-only screens. There may even be other information that the system uses to make this deduction (e.g., user profile information, generic demographic information and research, contextual information, etc.). Nevertheless, once the system determines that the user has no real interest in viewing search results as a whole, it can modify the script associated with the search process for this user and send the modified script to the user device to be used in place of the old, possibly default, script. Specifically, the script may alter the flow that occurs after screen 402 so that screens 406 and 420 are eliminated.

Figure 5:
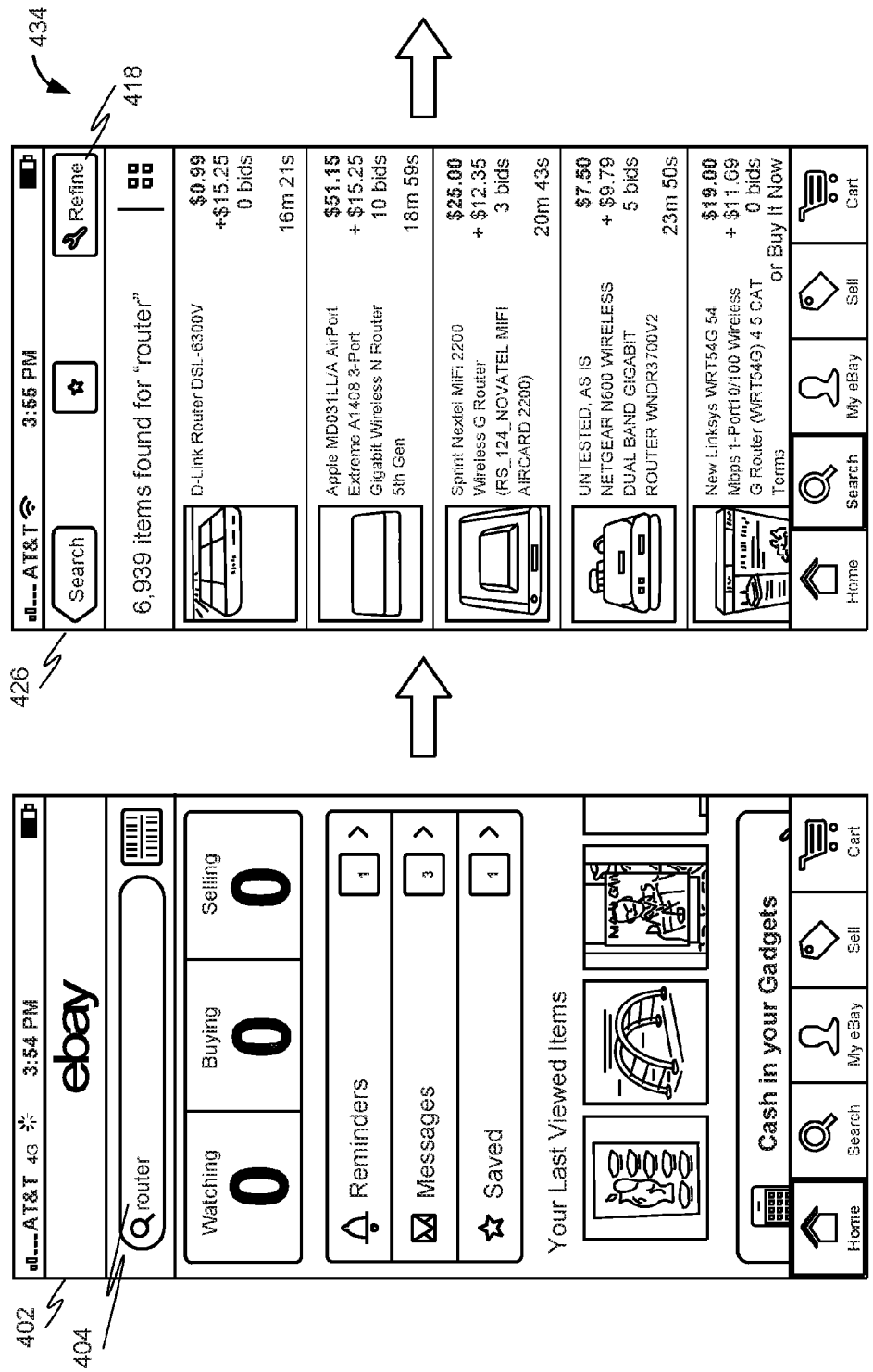
FIG. 5 is a diagram illustrating screen captures of a modified flow of an e-commerce application in accordance with an example embodiment.
Figure 5:
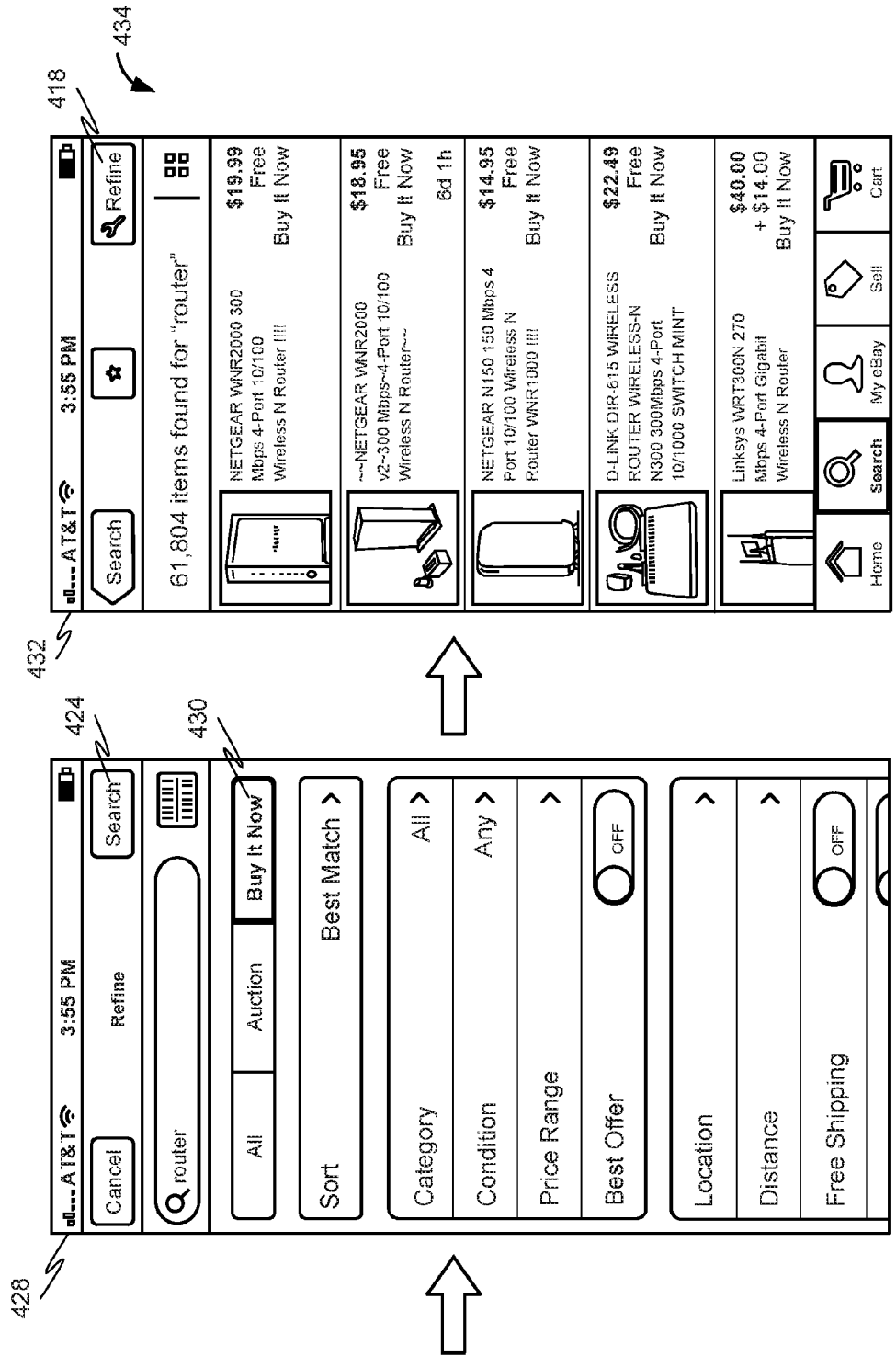

FIG. 5 is a diagram illustrating screen captures of a modified flow 434 of an e-commerce application in accordance with an example embodiment. Here, screens 406 and 420 have been eliminated from the flow, and the result of searching the term "router" from screen 402 is screen 426, automatically assuming that the user wishes to see auction-only results first. Notably, this results in a more efficient presentation to the user, as the user need only navigate four screens instead of six, and also has the secondary effect of reducing bandwidth usage and load (as fewer interactions are needed with the e-commerce server).

In an example embodiment, the modifications to the script may be user modifiable and overridable. For example, a first user may be explicitly presented with a proposed change to the flow, and may then assent or reject such a chance. For example, in the example flow from FIGS. 4 and 5 above, the user may be told that "It appears that you typically do not need to receive search results for both auction and buy-it-now items simultaneously but prefer to see them separately. Is that correct?" In another example embodiment, the user may be able to alter settings as to whether scripts are modifiable with or without his or her consent. In another example embodiment, the user may be able to set a sensitivity level, so that the system is either more or less aggressive with altering the scripts. The user may even specify what types of information the system uses in making its determination as to whether to alter the flow.

The decision as to whether to alter the flow by modifying a script on the user device may be triggered by a number of different scenarios. In one example embodiment, the system periodically reexamines the flows of all users based on the latest analytics information, and sends updated scripts as appropriate. In another example embodiment, the system is prompted to reexamine a script flow when the user begins execution of a flow. For example, in FIG. 4, the system may reexamine the flow once the user transitions from screen 402, and may alter the flow dynamically to the flow in FIG. 5, if it deems it appropriate, so that the user is automatically sent to screen 426.

Figure 6:
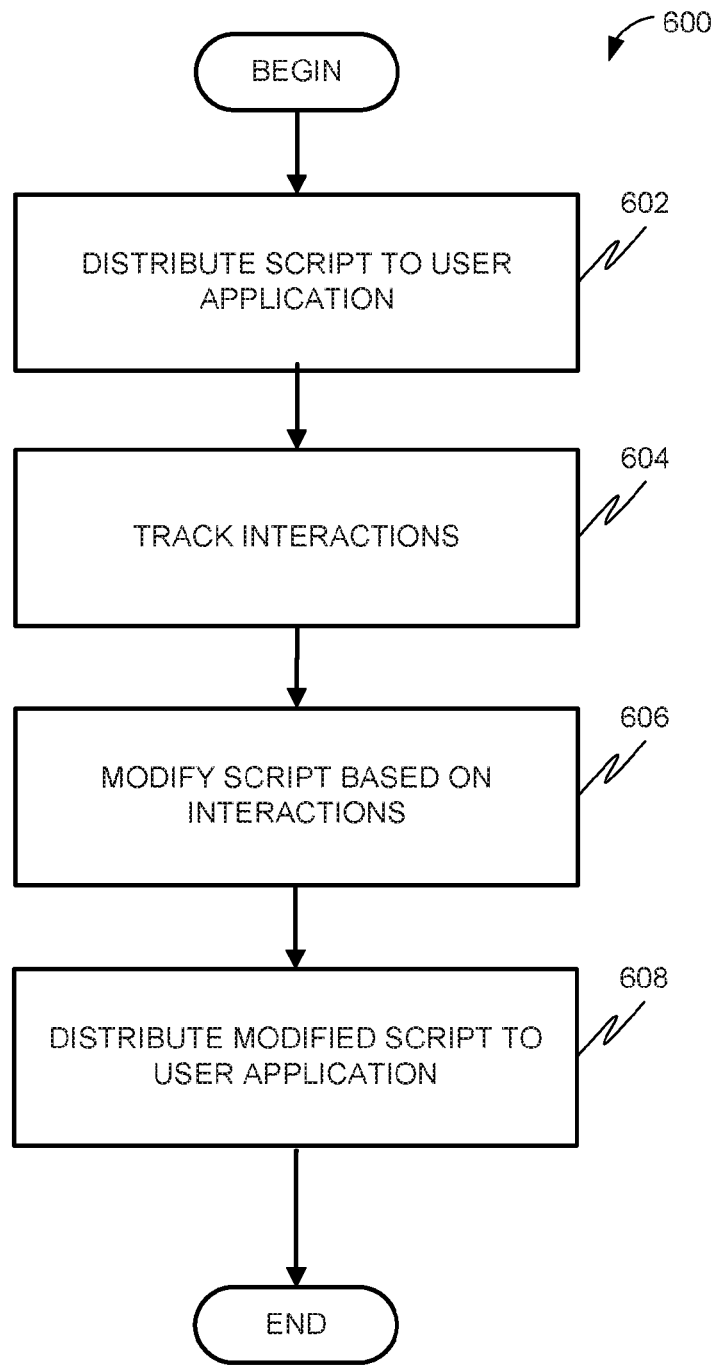
FIG. 6 is a flowchart illustrating an example method, consistent with various embodiments described above.

FIG. 6 is a flowchart illustrating an example method 600, consistent with various embodiments described above. The method 600 may be performed at least in part by, for example, an application server 118 illustrated in FIG. 1 (or an apparatus having similar functionality). In operation 602, a script defining flow of a user interface is distributed to a user application operating on a client device. As stated earlier, this user application may be, for example, a stand-alone application or a web browser. At operation 604, interactions between users on one or more client devices and one or more server devices may be tracked. These interactions may include user interactions with user interfaces. In operation 606, the script may be modified based on the information about the interactions. This modification alters the flow. In operation 608, the modified script may be distributed to the user application, thus causing a modification in the flow of the user interface of the user application.

In an example embodiment, the scripts themselves may have been pre-crated and associated with a series of user actions that may allow the system to substitute one script with another.

In another example embodiment, the user may have the ability to disable changes in the script and revert back to a default script, or freeze a current script and make that a new default script.

Example Mobile Device

Figure 7:
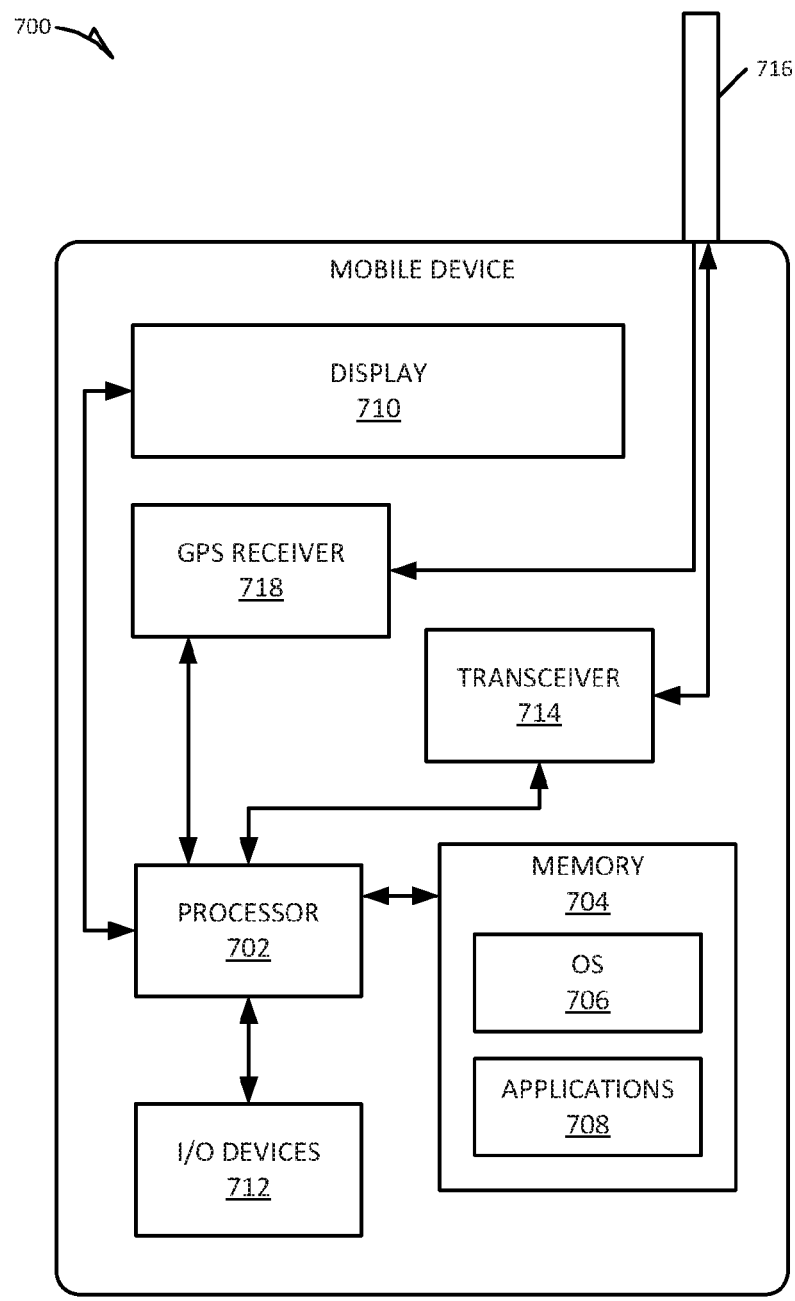
FIG. 7 illustrates an example of a mobile device, according to various embodiments.

FIG. 7 is a block diagram illustrating a mobile device 700, according to an example embodiment. The mobile device 700 may include a processor 702. The processor 702 may be any of a variety of different types of commercially available processors 702 suitable for mobile devices 700 (for example, an XScale architecture microprocessor, a microprocessor without interlocked pipeline stages (MIPS) architecture processor, or another type of processor 702). A memory 704, such as a random access memory (RAM), a flash memory, or other type of memory, is typically accessible to the processor 702. The memory 704 may be adapted to store an operating system (OS) 706, as well as application programs 708, such as a mobile location enabled application that may provide LBSs to a user. The processor 702 may be coupled, either directly or via appropriate intermediary hardware, to a display 7010 and to one or more input/output (I/O) devices 712, such as a keypad, a touch panel sensor, a microphone, and the like. Similarly, in some embodiments, the processor 702 may be coupled to a transceiver 714 that interfaces with an antenna 716. The transceiver 714 may be configured to both transmit and receive cellular network signals, wireless data signals, or other types of signals via the antenna 716, depending on the nature of the mobile device 700. Further, in some configurations, GPS receiver 718 may also make use of the antenna 716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 702 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 702 or other programmable processor 702) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 702 configured using software, the general-purpose processor 702 may be configured as respective different hardware-implemented modules at different times. Software may accordingly configure a processor 702, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors 702 or processor-implemented modules. The performance of certain of the operations may be distributed among the one or more processors 702, not only residing within a single machine, but deployed across a number of machines. In some example embodiments, the processor 702 or processors 702 may be located in a single location (e.g., within a home environment, an office environment or as a server farm), while in other embodiments the processors 702 may be distributed across a number of locations.

The one or more processors 702 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 702, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 702 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 702), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
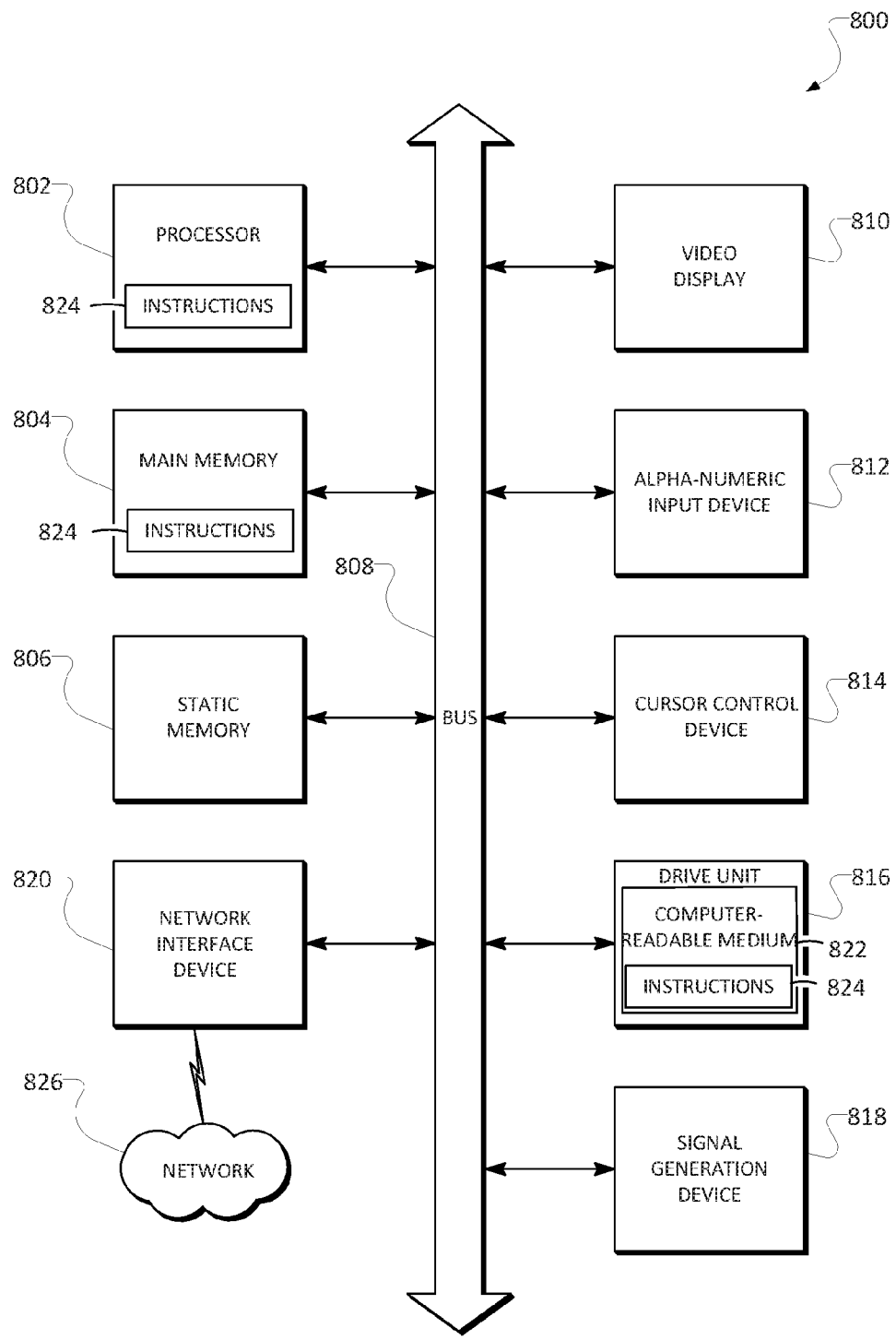
FIG. 8 is a diagrammatic representation of a machine in the example form of a computer system within which a set of instructions may be executed for causing the machine to perform any one or more of the methodologies discussed herein.

FIG. 8 is a block diagram of machine in the example form of a computer system 800 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions 824 for execution by the machine and that cause the machine to perform any one or more of the methodologies of the present disclosure or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An apparatus comprising:
   a processor;
   a memory;
   a script distribution application, executable by the processor, and configured to distribute a script defining a flow of a user interface to a user application operating on a client device, the script written in a computer scripting language and interpreted at runtime by a special runtime environment in the user application, the flow defining a sequence of user interface screens and user interface elements displayed on each of the user interface screens;
   a tracking application, executable by the processor, and configured to track interactions between one or more client devices and one or more server devices, the interactions including interactions generated in response to user input to the one or more client devices, and to store information about the interactions in the memory;

a scripting modification application configured to modify the script based on the information about the interactions, the modification changing the flow; and the script distribution application being further configured to distribute the modified script to the user application, thus causing a modification in the flow of the user interface of the user application.

2. The apparatus of claim 1, wherein the user application is a stand-alone application.

3. The apparatus of claim 1, wherein the user application operates in a web browser.

4. The apparatus of claim 1, wherein the information about interactions include information about how a user previously traversed the flow of the user interface.

5. The apparatus of claim 1, wherein the information about interactions includes contextual information.

6. The apparatus of claim 1, wherein the information about interactions includes information about purchases made via the flow.

7. A method comprising:

distributing a script defining a flow of a user interface to a user application operating on a client device, the script written in a computer scripting language and interpreted at runtime by a special runtime environment in the user application, the flow describing a sequence of user interface screens and user interface elements displayed on each of the user interface screens;

tracking interactions between users on one or more client devices and one or more server devices, the interactions including interactions generated in response to user input to the one or more client devices;

modifying the script based on information about the interactions, the modification changing the flow; and distributing the modified script to the user application, thus causing a modification in the flow of the user interface of the user application.

8. The method of claim 7, wherein the information about interactions includes information about how a user previously traversed the flow of the user interface.

9. The method of claim 7, wherein the information about interactions includes contextual information.

10. The method of claim 7, wherein the information about interactions includes information about purchases made via the flow.

11. The method of claim 7, wherein the modifying further includes modifying the script based on user demographic information.

12. The method of claim 7, wherein the modifying further includes modifying the script based on user profile information.

13. A method comprising:

distributing a script defining a flow of a user interface to a user application operating on a client device, the script written in a computer scripting language and interpreted at runtime by a special runtime environment in the user application, the flow describing a sequence of user interface screens and user interface elements displayed on each of the user interface screens;

tracking user input to the user interface of the user application;

modifying the script based on the user input, the modification changing the flow; and distributing the modified script to the user application, thus causing a modification in the flow of the user interface of the user application.

14. The method of claim 13, wherein the modifying further includes modifying the script based on user demographic information.

15. The method of claim 13, wherein the modifying further includes modifying the script based on user profile information.

16. The method of claim 13, wherein the modifying further includes modifying the script based on location information.

* * * * *